Figure 1:
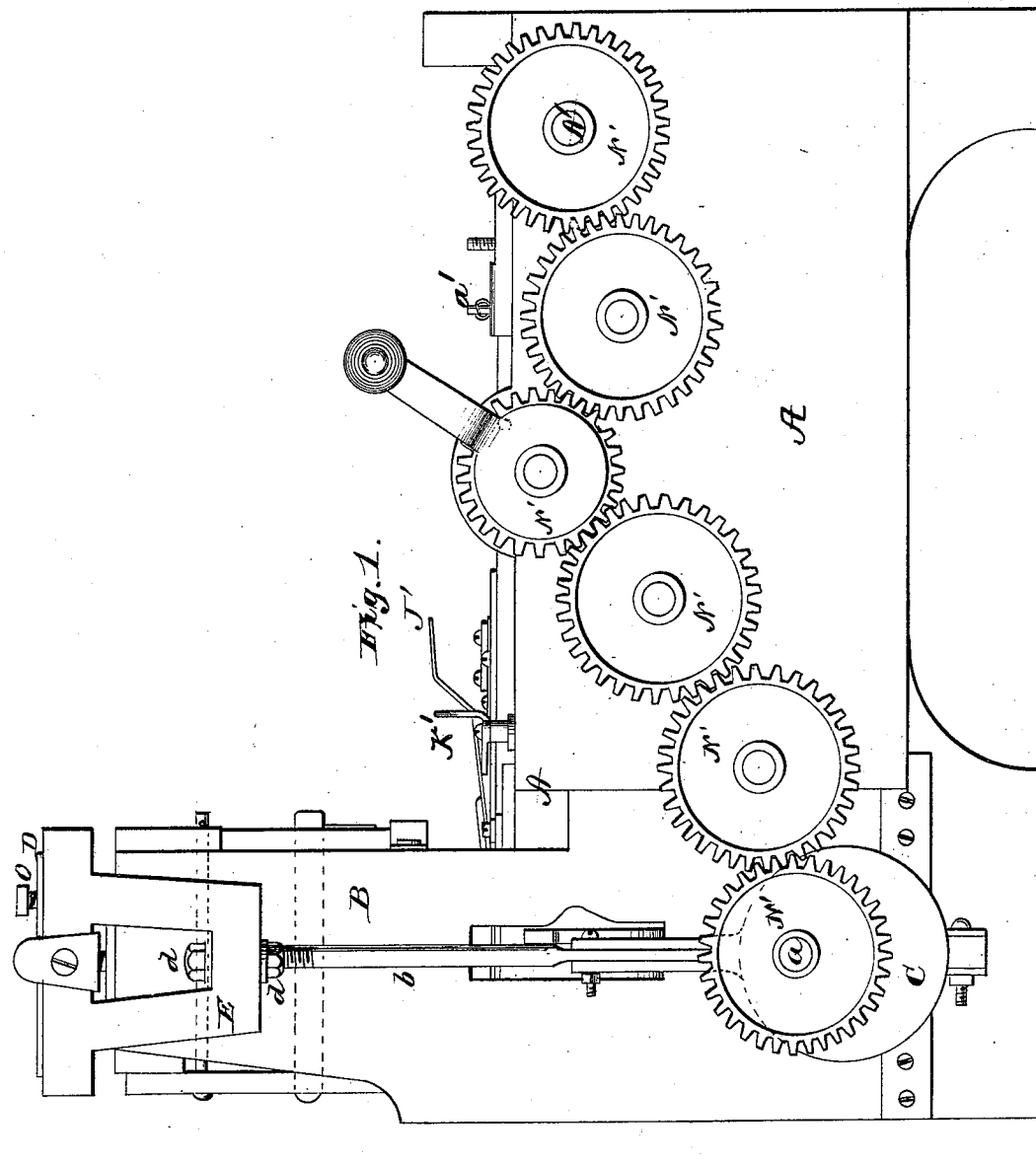

7 Sheets—Sheet 1.

J. H. DORGAN.
Horseshoe Machine.

No. 230,180. Patented July 20, 1880.

WITNESSES
Franck L. Ouraud
H. Aubrey Toulmin

INVENTOR
J. H. Dorgan
Alexander & Mason
ATTORNEYS

N. PETERS, PHOTO-LITHOGRAPHER, WASHINGTON, D.C.

7 Sheets—Sheet 2.
J. H. DORGAN.
Horseshoe Machine.
No. 230,180. Patented July 20, 1880.
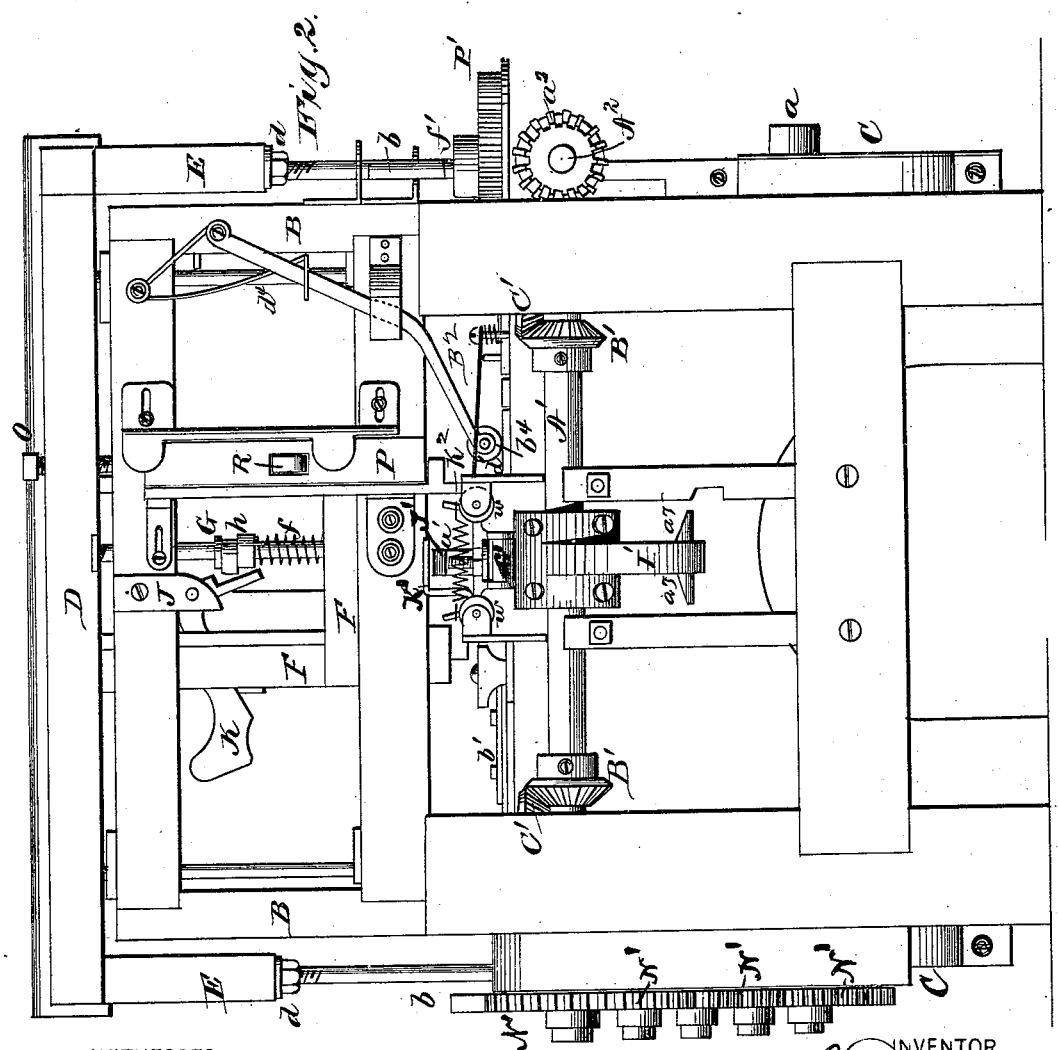
WITNESSES
INVENTOR
ATTORNEYS

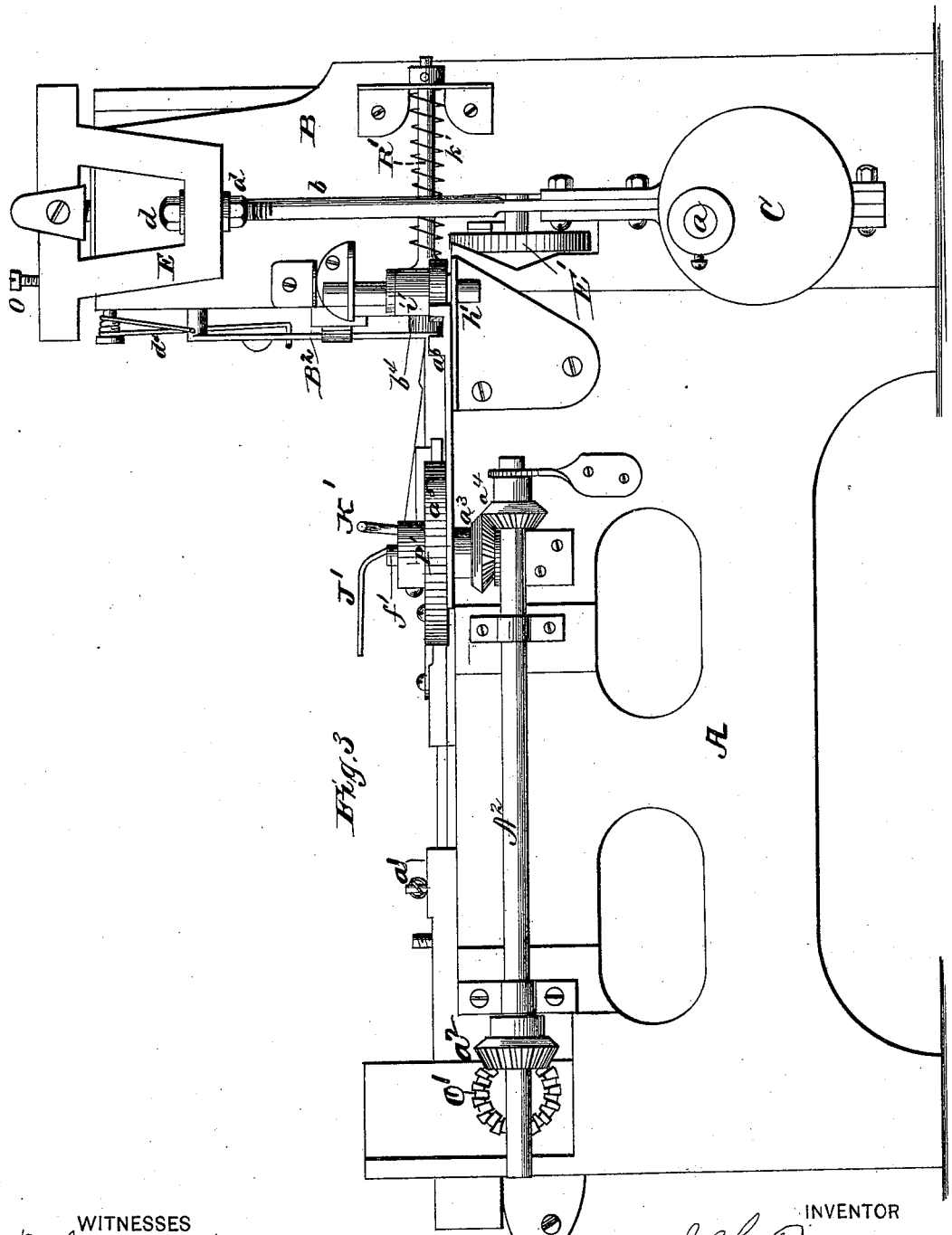

7 Sheets—Sheet 4.
J. H. DORGAN.
Horseshoe Machine.
No. 230,180.  Patented July 20, 1880.
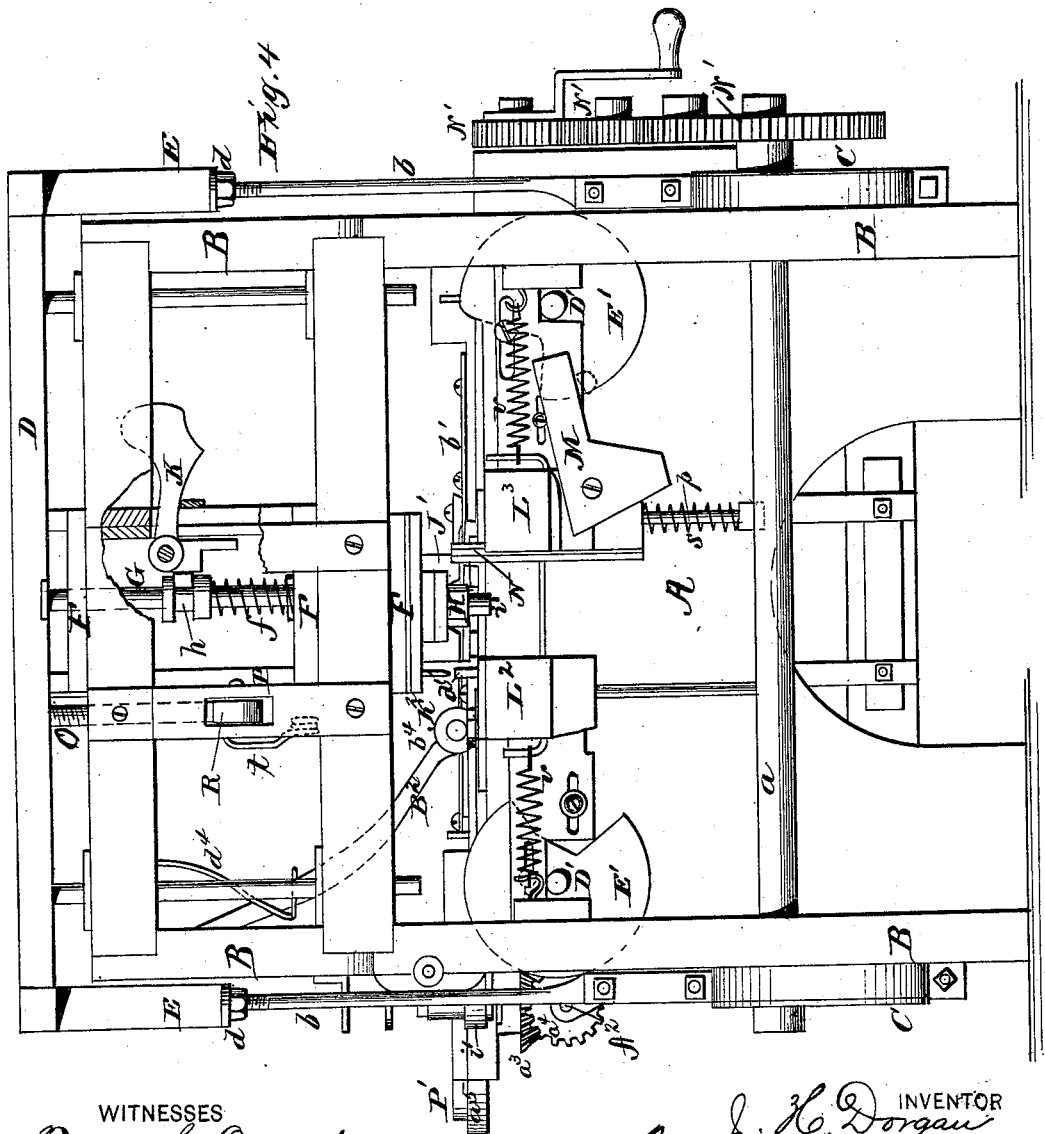

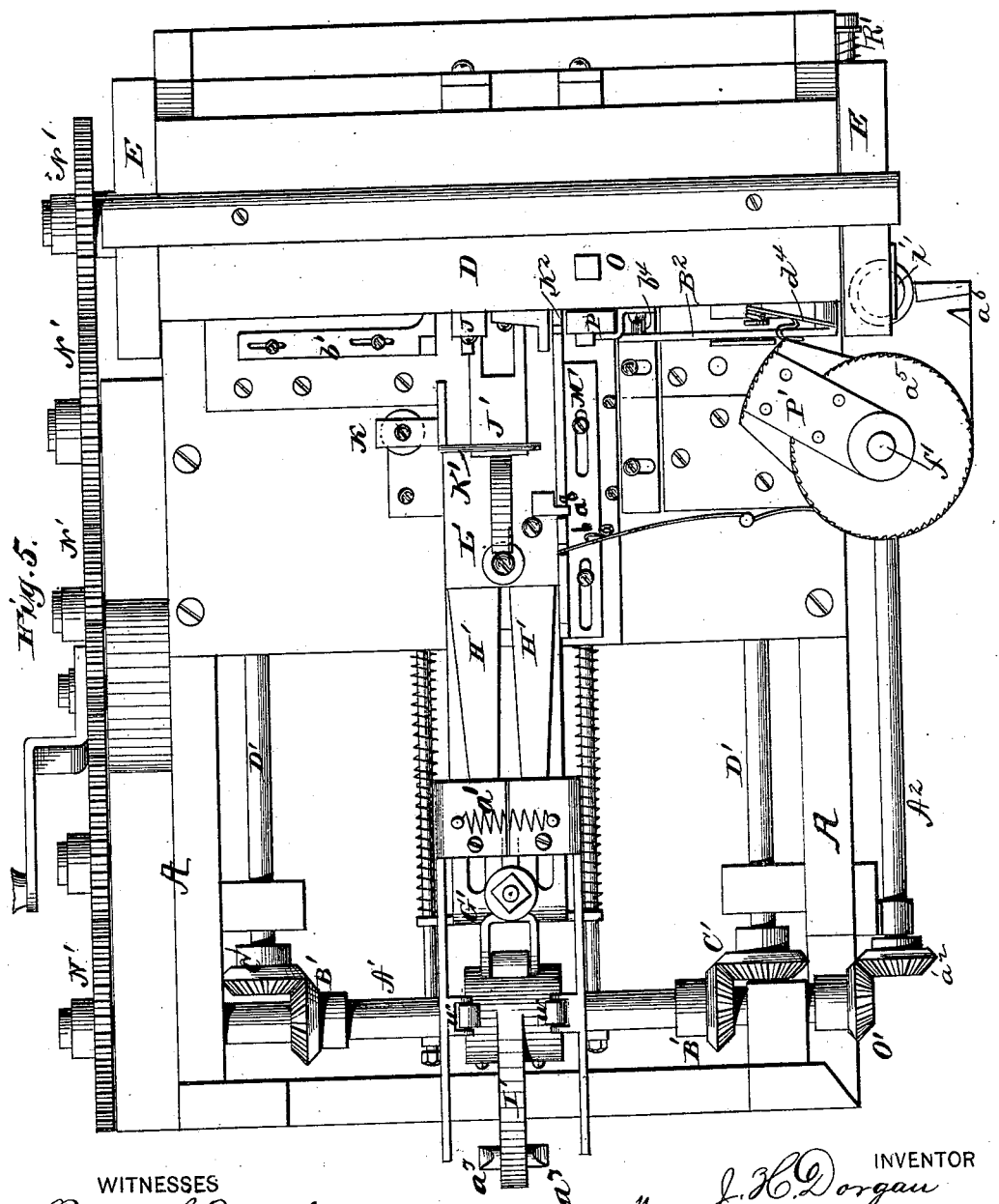

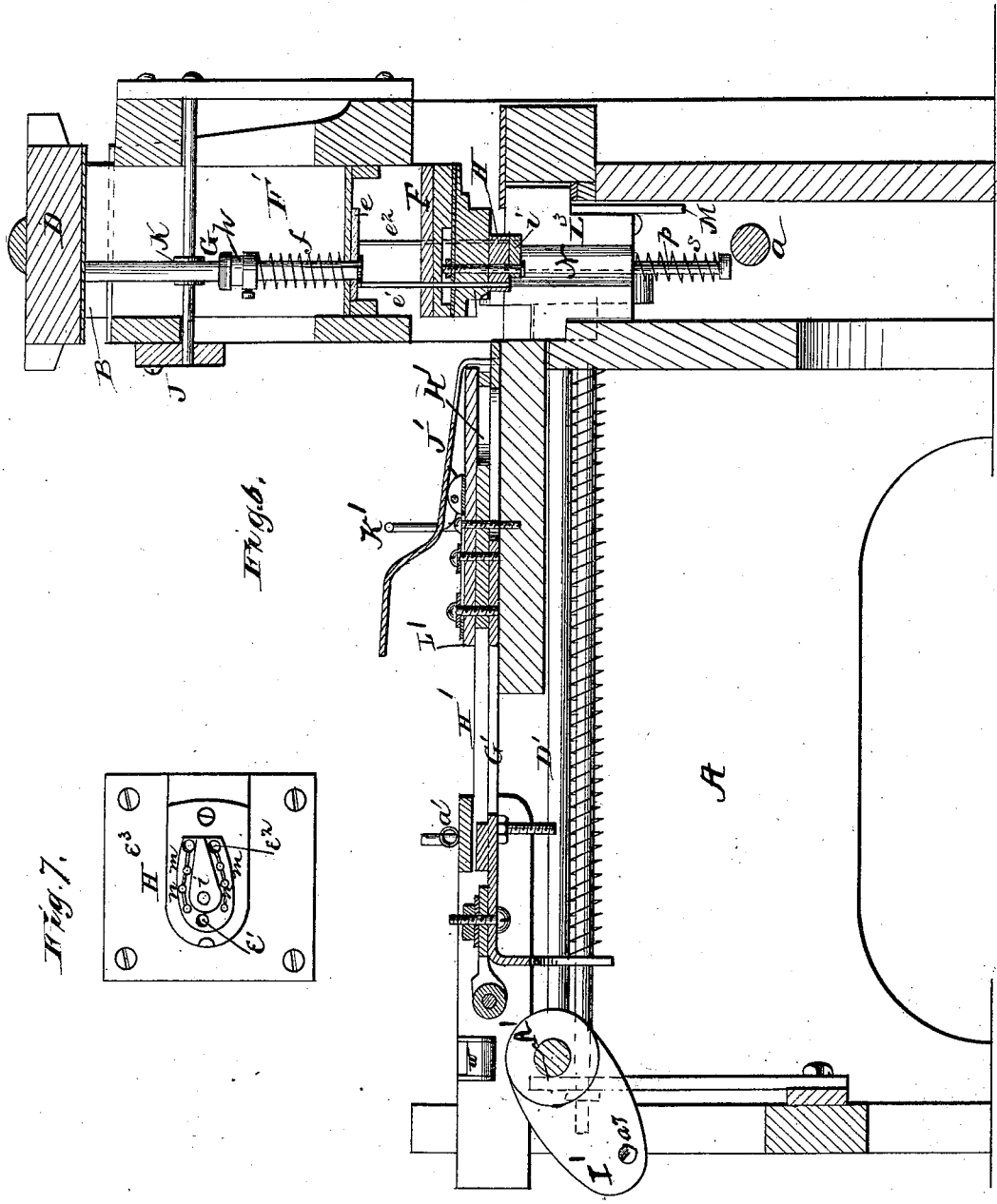

7 Sheets—Sheet 7
J. H. DORGAN.
Horseshoe Machine.
No. 230,180.　　　　　　　Patented July 20, 1880.
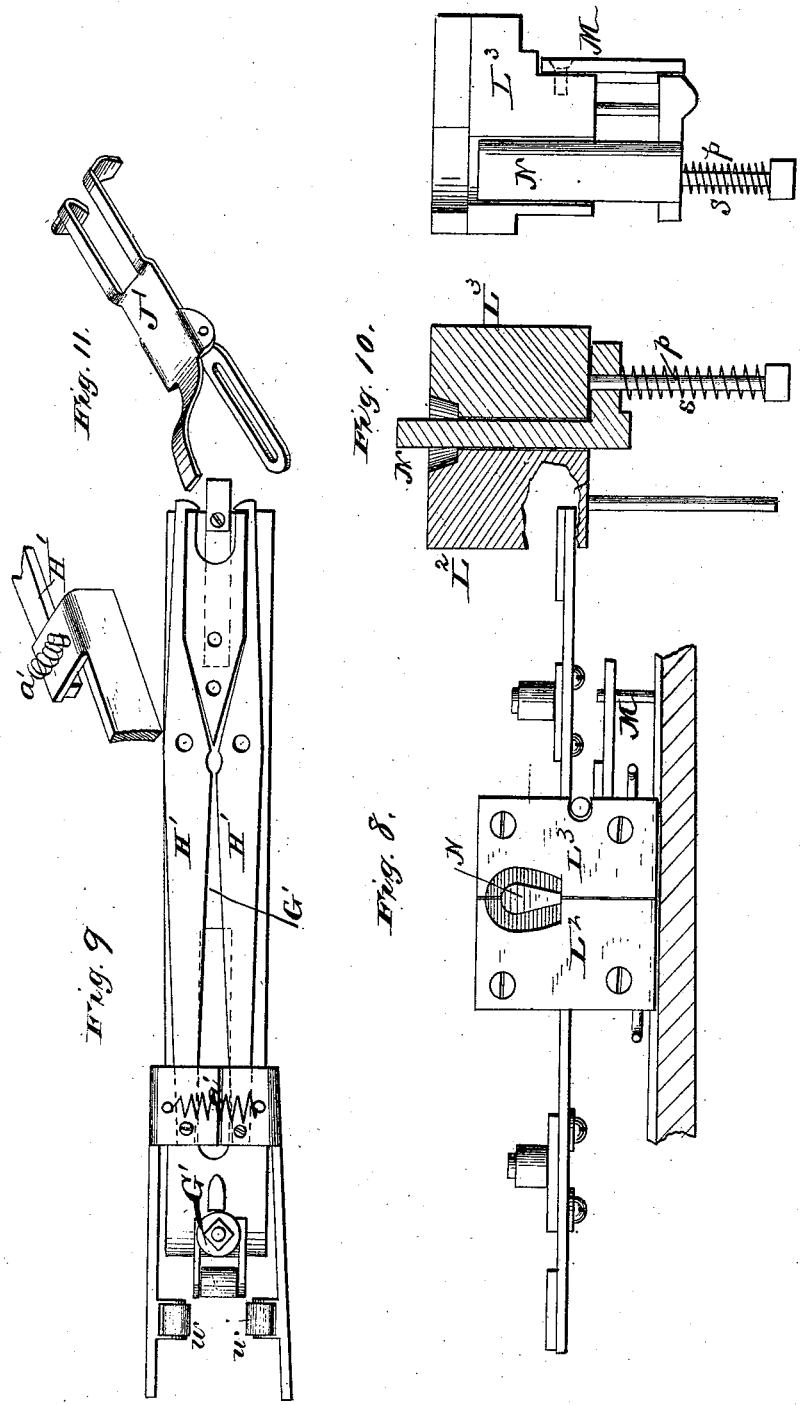
WITNESSES　　　　　　　　　　　　　　　INVENTOR
　　　　　　　　　　　　　　　　　　　　ATTORNEYS

UNITED STATES PATENT OFFICE.

JOSEPH H. DORGAN, OF PLATTSBURG, NEW YORK.

HORSESHOE-MACHINE.

SPECIFICATION forming part of Letters Patent No. 230,180, dated July 20, 1880.

Application filed July 22, 1879.

*To all whom it may concern:*

Be it known that I, JOSEPH H. DORGAN, of Plattsburg, in the county of Clinton, and in the State of New York, have invented certain new and useful Improvements in Horseshoe-Machines; and I do hereby declare that the following is a full, clear, and exact description thereof, reference being had to the accompanying drawings, and to the letters of reference marked thereon, making a part of this specification.

My invention relates to the construction of a horseshoe-machine; and it consists in the construction and combination of parts, as will be hereinafter more fully set forth, and pointed out in the claims.

In order to enable others skilled in the art to which my invention appertains to make and use the same, I will now proceed to describe its construction and operation, referring to the annexed drawings, in which—

Figure 1 is a side elevation of my improved horseshoe-machine. Fig. 2 is a rear elevation of the same. Fig. 3 is a side elevation of the machine from the side opposite to the side shown in Fig. 1. Fig. 4 is a front view, Fig. 5 a plan view, and Fig. 6 a longitudinal vertical section, of the machine. Figs. 7, 8, 9, 10, and 11 are detailed views of parts of the machine.

A represents the bed of the machine, provided on each side, at the front end, with a standard, B, as shown.

Through the lower ends of the standards B B passes a shaft, $a$, upon each end of which is secured an eccentric, C, or a crank, for operating the top beam, D, above the standards, up and down.

Each eccentric C is connected with a yoke, E, at the end of the beam D, by a strap and rod, $b$. Each rod has screw-threads on its end, and is fastened and capable of adjustment by means of nuts $d$ $d$, so as to regulate the height the beam will be elevated above the standards.

At the rear end of the machine is a shaft, A', and the two shafts $a$ A' are connected by a system of gear-wheels, N', substantially as shown in Fig. 1.

At one end of the shaft A' is a gear-wheel, O', which, through the medium of a longitudinal shaft, A², and suitable gear-wheels $a^2 \, a^3 \, a^4$, communicates motion to a vertical shaft, $f'$, carrying a disk, $a^5$, to which a cam, P', is bolted. This cam is milled on its face to adhere to the bar of iron and force or feed it forward into the machine the proper distance.

Opposite the cam P' is a roller, $i'$, on a shaft, $h'$, with a presser-bar, R', to which is attached a spiral spring, $k'$, for pressing the roller $i'$ against the bar of iron as it is being fed into the machine.

A bar of iron, after it is red-hot, is put in the guide $a^6$, between the roller $i'$ and the feed-cam P'. This cam then revolves and moves the hot iron bar inward until it abuts against the gage $b'$, which is adjustable so as to regulate the length of the bar to be cut off for the shoe-blank. The iron bar, as it passes into the machine, as above described, is held down on the bed by means of a roller, $b^4$, which is mounted on the lower end of an arm, B², this arm being pivoted at its upper end and acted upon by a spring, $d^4$, to hold the roller down, as shown in Fig. 2.

$d'$ is the stationary knife on the bed of the machine, which acts, in conjunction with the cutter K², to cut the bar of iron.

Through the beam D is passed a screw, O, for operating the cutter K². This cutter is fastened to a vertically-sliding bar, P, moving in adjustable guides attached to the framework of the machine. In a mortise in the sliding bar P projects one end of a lever, R, the other end of which is pivoted to the framework, and a spring, $t$, is arranged at the side of the said lever for raising the bar P with the cutter. When the bar of iron has been fed up against the gage $b'$ the beam D descends and the screw O strikes the lever R, forcing down the cutter and severing the blank from the hot iron bar. As the beam ascends again the spring $t$ raises the lever and cutter.

On the center of the shaft A' is a cam, I', for moving a sliding bar, G', forward, and to this sliding bar are attached the two levers H' H', which are the immediate means for carrying forward the cut off blank and bending the same around the forming-rod. The blank is left directly in front of the forward ends of the levers H', and as the bar G' and said levers are moved forward a suitable distance the levers bend the blank in U form around the former N, hereinafter described.

On the sides of the cam I' are cams $a^7$, which operate against rollers $w\ w$ at the outer ends of the levers H', forcing the same apart, so that their inner ends will close the blank tight around the former N.

The bending-levers H' are pivoted to the bar G', and their outer ends are forced together by a spring, $a'$, after the cams $a^7$ have passed from between them, thus opening or separating the forward ends of the levers.

At the front end of the bar G' and levers H' is a device, J', for holding the blank on the bar after it has been cut from the bar of iron by the knife, and prevent it from falling out on its forward motion into the machine.

K' is a bar placed across the bar G' and levers H', and screwed into the bed of the machine to raise up the device J' out of the way of the blank just before it is bent around the former.

L' is a plate fastened to the bar G' and over the levers H', for holding the device J' in place.

M' is a movable bar on the bed of the machine, operated as follows: At the time the cutter descends the bar G' is in a rearward position, and a lug, $a^8$, on the plate L' of said bar keeps the bar M' also pulled back. A spring, $b^6$, throws said bar forward when the bar G' advances, and causes it to prevent further feed of the bar while the bending and swaging devices are operating upon the blank.

Attached to the beam D is a plunger, F, through which passes the rod G. This rod has a plate, $e$, attached to its lower end, and to this plate are riveted the three small clearing-rods $e'\ e^2\ e^3$, which pass down through the top die, H. On the rod G is a spiral spring, $f$, to bring the same back to its place after the small rods have discharged the shoe.

From a beam connecting the standards B B projects a hanger, J, which supports a shaft on which works a trigger, K, having one end notched to catch on a collar or projection, $h$, on the rod G, and hold the same down at the proper time.

At the bottom of the plunger F is fastened the top die, H, which is formed with a projection, $i$, of such size that the shoe will be pressed around the same. Around this projection on the face of the die are creasers $m$ and punches $n$.

Sliding on suitable ways in the bed A are the bottom dies, $L^2\ L^3$.

N is the forming-rod, around which the blank is bent by the levers H', as above described. This forming-rod is attached to a block capable of sliding on a rod, $p$, depending from the right-hand die $L^3$, the forming-rod being held up by means of a spring, $s$, surrounding the rod $p$, as shown.

The dies $L^2\ L^3$ are provided at the sides with springs $v$, for drawing them back after the operating-cams have turned around to the proper point to allow the finished shoe to drop down out of the machine.

The shaft A' at the rear end of the machine is provided with bevel-gears B', meshing with similar gears C' on side shafts, D', running lengthwise inside of the frame of the machine. At the front ends of the shafts D' are attached cams E', for operating the dies $L^2\ L^3$ and moving them forward.

While the bending-levers are operating to bend the blank around the former N, as above described, the dies $L^2\ L^3$ are, of course, closed or held together; and as the bending-levers open and draw back the beam D, operated by the eccentrics or cranks C, descends with the plunger F and presses the top die, H, down upon the bent blank, forcing it into the bottom dies and punching and creasing said blank.

The projection $i$ of the top die, however, first forces down the forming-rod N and enters the blank, so that when the pressure is brought to bear the blank has been stripped from the forming-rod and taken onto said projection.

When the forming-rod N is thus pressed down by the top-die projection a pivoted trigger, M, on the side of the die $L^3$ catches on the block at the lower end of the rod and holds it in this position until the bottom dies are separated, when the trigger is automatically released, and the forming-rod is, by the spring $s$, brought up into place again.

The trigger M is automatically released at the time the lower die $L^3$ is drawn outward by its spring $v$, by striking a suitable stop arranged for the purpose.

After the beam D has descended to cause the top die to operate on the shoe-blank, as above described, and as it is being carried up by the eccentrics or cranks C, the cams E' revolve, bringing recesses opposite the dies $L^2\ L^3$, which are then caused to separate by the springs $v$.

The rod G is held down by the trigger K as the beam D rises, which causes the three rods $e'\ e^2\ e^3$ to strip the finished shoe from the projection of the top die and allow it to drop down under the machine. The dies $L^2\ L^3$ are then forced into position again by their cams to receive another shoe-blank.

I claim—

1. The reciprocating bar G', the bending-levers H', device J' for holding the blank on the bar, and the rollers $w$, attached to the levers, in combination with the cam I', having side cams, $a^7$, and suitable dies with former or forming-rod, all substantially as and for the purposes herein set forth.

2. The combination of the bottom dies, $L^2\ L^3$, cams E', forming-rod N, rod $p$, with spring $s$, and the trigger-lever M, substantially as and for the purposes herein set forth.

3. The combination of the beam D, plunger F, rod G, with collar $h$, spring $f$, and the plate $e$, having the clearing-rods $e'\ e^2\ e^3$, the trigger K, and the top die, H, with projection $i$, all constructed substantially as and for the purposes herein set forth.

4. The combination of the milled cam P', roller $i'$, shaft $h'$, presser-bar R', and spring $k'$ with the spring-arm $B^2$, carrying the roller $b^4$, and the cutter $K^2$, operated by the beam D, screw O, lever R, sliding bar P, and spring $t$, substantially as and for the purposes herein set forth.

5. The combination of the sliding bar $G'$, bending-levers $H'$, plate $L'$, with lug $a^6$, sliding bar $M'$, and spring $b^6$, all constructed substantially as and for the purposes herein set forth.

In testimony that I claim the foregoing I have hereunto set my hand and seal this 19th day of May, 1879.

JOSEPH HENRY DORGAN. [L. S.]

Witnesses:
S. G. KELLOGG,
J. P. BRENAN.